United States Patent [19]

Pohlenz

[11] 4,193,972

[45] Mar. 18, 1980

[54] TREATING PARTICLE-CONTAINING SOX OR NOX GAS STREAMS IN PARALLEL PASSAGE CONTACTORS

[75] Inventor: Jack B. Pohlenz, Arlington Heights, Ill.

[73] Assignee: UOP Inc., Des Plaines, Ill.

[21] Appl. No.: 847,968

[22] Filed: Nov. 2, 1977

[51] Int. Cl.² .................. C01B 17/00; B01J 8/00; C01B 21/00
[52] U.S. Cl. ................................ 423/244; 423/239
[58] Field of Search .......... 423/242, 244, 239, 240, 423/215.5; 55/77, 474, 479

[56] References Cited

U.S. PATENT DOCUMENTS

| | | | |
|---|---|---|---|
| 3,501,897 | 3/1970 | Van Helden et al. | 423/244 |
| 3,615,196 | 10/1971 | Welty et al. | 423/242 |
| 3,937,953 | 5/1976 | Squires | 423/244 |
| 3,966,879 | 6/1976 | Groenendaal et al. | 423/244 |
| 4,102,980 | 7/1978 | Sasaki et al. | 423/239 |

FOREIGN PATENT DOCUMENTS 5035053  4/1975  Japan ..................... 423/240

Primary Examiner—O. R. Vertiz
Assistant Examiner—Gregory A. Heller
Attorney, Agent, or Firm—James R. Hoatson, Jr.; John F. Spears, Jr.; William H. Page, II

[57] ABSTRACT

A process for the treatment of a gas stream by passing the gas stream parallel to the outer screen of a contactor bed wherein the detrimental effects caused by the accumulation of fine particles on the screen is counteracted by the periodic or continuous admixture of additional fluidizable particles into the gas stream. The invention may be adapted to many processes in which a particle-containing gas stream is treated using a parallel flow vapor-solids contacting apparatus including the adsorption of specific chemical compounds, the oxidation of sulfur-containing compounds or the reduction of nitrogen oxides.

3 Claims, No Drawings

TREATING PARTICLE-CONTAINING SOX OR NOX GAS STREAMS IN PARALLEL PASSAGE CONTACTORS

FIELD OF THE INVENTION

The invention relates in general to a process for the treatment or purification of a gas stream. The invention more particularly relates to a process for the removal of a gaseous chemical compound from a particle-containing gas stream through the use of a parallel passage solids-vapor contactor. Specific embodiments of the invention relate to the removal of sulfur oxides from a gas stream by the use of a metal-containing regenerable acceptor and to the reduction of nitrogen oxides contained in the gas stream to nitrogen. The gas stream treated in the process may be the flue gas produced in an oil or coal-fired burner, such as the furnace of a steam-driven electrical power generating plant.

PRIOR ART

Parallel passage vapor-solids contactors are known in the art and are utilized for processing gas streams containing particulate matter, e.g., fly ash. One application of parallel passage contactors is the use of solid acceptors for the removal of sulfur oxides from flue gas streams. This area of the art is becoming well developed due to increasingly stringent pollution control regulations. The acceptors contained within the contactors are regenerable metal-containing particles, fibers or shaped castings. Their composition, design, use and manufacture are described in U.S. Pat. Nos. 3,501,897 (Cl. 55-73); 3,707,831 (Cl. 55-483); 3,747,308 (Cl. 55-387); 3,764,665 (Cl. 423-574); 3,770,647 (Cl. 252-190); 3,776,854 (Cl. 252-190); 3,832,445 (Cl. 423-244); 3,892,677 (Cl. 252-411S); and 3,989,798 (Cl. 423-244).

Parallel passage vapor-solids contactor configurations are described in previously cited U.S. Pat. Nos. 3,501,897, 3,707,831 and 3,747,308. In a parallel passage contactor, the gas stream is passed alongside, rather than through, the planar outer surface of an acceptor bed. This mode of operation was developed to avoid plugging of the bed by filling the interstitial volume of the bed with particles such as fly ash and soot. If the gas stream is passed through the acceptor bed, the bed acts as a filter and the particles eventually clog vapor passageways thereby creating unacceptably high pressure drop and gas bypassing and causing a substantial falloff in the performance of the system.

The use of a parallel passage reactor is described at page 86 of the Apr. 11, 1977 issue of *Chemical Engineering*. The reactor is used for the reduction of nitrogen oxides contained in a gas stream which also contains sulfur oxides and dust.

BRIEF SUMMARY OF THE INVENTION

The invention provides a process for the treatment of gas stream through the use of a parallel passage contactor, such as the adsorption of halogen compounds from the gas stream, wherein the accumulation of particulate matter is reduced or eliminated by adjusting the size distribution or increasing the concentration of the particulate matter in the gas stream. This may be accomplished by adding fluidizable particles to the gas stream and may be performed continuously or intermittently.

The invention also provides a process for the removal of sulfur oxides from gas streams through the use of a regenerable metal-containing acceptor and a method of removing fine particulate matter from the outer surface of a parallel passage vapor-solids contactor. A broad characterization of one embodiment of the invention is a process for the removal of sulfur oxides from a gas stream containing fine particles which comprises the step of adding an additional quantity of fluidizable particles to the gas stream and then passing the gas stream parallel to the outer surface of a bed of metal-containing sulfur oxide acceptors. In another embodiment of the invention, an acceptor zone reconditioning vapor stream containing relatively coarse particles is passed across the outer surface of a parallel passage acceptor bed either just prior to or after regeneration of the acceptor bed to thereby remove accumulated fine particles from the outer surface of the acceptor bed.

DETAILED DESCRIPTION

Parallel passage vapor-solids contactors, such as described in the previously cited references, may be used in a variety of gas treating processes. One process to which these contactors have been applied is the removal of sulfur oxides from particle-containing flue gas streams such as those produced by coal-fired power plants. This process requires contact between the acceptor and the gas stream. This could be accomplished by passing the gas stream through a bed of the acceptor. However, this is impractical in the case of flue gases and other low pressure streams containing particulate matter. This is because the particles become trapped in the acceptor bed, and this eventually leads to prohibitive pressure drops and poor contact between the gas stream and the acceptor/catalyst. The parallel passage acceptors previously referred to are one specific type of parallel passage contactor which were developed as a solution to these problems.

In a parallel passage contactor, the acceptor/catalyst is in the form of spheres, extrudates, or pellets and is confined to thin beds or envelopes by porous screens. The gas stream is passed parallel to the surface of these screens, and the various components of the gas stream diffuse through the openings in the screens to contact the acceptor or catalyst. Since the velocity vector of the gas stream is parallel to the acceptor bed rather than through it, the acceptor bed therefore does not act as a filter for fly ash or other particulate material contained in the gas stream. Even though some particulate matter does deposit on the surface of the wire which forms the screens and on the surface of the acceptor, a light deposit does not interfere with diffusion of the reacting species to the active sites of the acceptor unless the screen openings become completely filled, i.e. blinded, such that the surface roughness is decreased, turbulence at the screen boundary is reduced and the combination of the physical blockage and less turbulence results in a reduction in the rate of material transfer to the acceptor/catalyst.

The acceptor bed "fouling" with which the subject invention is concerned is the gradual deposition of particulate matter on the screen which confines the acceptor spheres or pellets. This gradually closes the openings in the screen. The result is that the screen appears to be covered with the particulate matter to a degree that the passage of light is blocked. It has been found that the performance of the acceptor bed decreases as the acceptor bed becomes fouled in this manner even though the bed itself has accumulated relatively little particulate matter. The exact reason or reasons for this falloff in performance have not been discerned. One plausible explanation is that the diffusion of gases to the acceptor is hindered by the covering. Another possible explanation is the partial filling of interstitial spaces in the acceptor bed itself.

A third theory to explain the falloff in acceptor performance is that the covering which accumulates on the woven wire screens smooths the surface of the screen to the extent that turbulence at the screen is reduced, thereby reducing the mixing of gases on the two sides of the screen and the transmission of gases to and from the acceptor. This theory is supported by a correlation between a decrease in the pressure drop through the acceptance zone and a decrease in the performance of the acceptance zone. That is, the friction factor or roughness factor corresponding to flow parallel to the screen's outer surface appears to decrease as the screen becomes fouled and as the performance of the acceptors within the screen decreases.

One method of preventing the problems associated with the accumulation of particles on the surface of the contactor screen is to remove the particles from the gas stream before the gas stream is passed into the contacting zone. The removal of particles may also be required to meet environmental standards on particle emissions. It is therefore becoming a standard practice to utilize a very efficient particle removal zone, such as an electrostatic precipitator, to remove a great majority of the particles from the gas stream. However, the objective of total particle removal is not practical on commercial scale units, even through removal rates of 98–99.9% are feasible with modern separatory techniques. The utilization of an electrostatic precipitator therefore does not prevent the contactor from being exposed to particulate matter. Nevertheless, the dominant approach to the prevention of detrimental particle accumulation in the contacting zone has been to achieve higher degrees of particle removal from the gas stream.

It is, therefore, an objective of this invention to provide a process for the treatment of particle-containing gas streams, such as the reduction of nitrogen oxides in flue gas streams, in a parallel passage vapor-solids contactor. It is a further objective of this invention to provide a parallel flow process for the removal of sulfur oxides from a gas stream containing particulate matter, such as fly ash, which is not troubled by the accumulation of particulate matter. It is another objective to provide a method of removing accumulated relatively fine particles from the screen of a parallel flow sulfur oxide acceptor bed or from the outer screen of other parallel flow beds used to treat sulfur-containing gas streams.

It has now been found that the accumulation of particles in the openings of the screen used in a parallel flow vapor-solids contactor is reduced or eliminated by increasing the concentration of particulate matter in the gas stream being treated through use of the contactor. It has also been found that accumulated fine particles can be removed from the screen openings of a parallel flow acceptor or reactor by the addition of relatively coarse particles to the gas stream being treated. Another surprising discovery is that parallel flow acceptors which have been troubled by the accumulation of fine particles despite being located downstream of a highly efficient electrostatic precipitator may be effectively operated upstream of the precipitator, where the concentration of particles of fly ash is high, without plugging, screen blinding, or a change in pressure drop through the acceptor zone.

The variety of ways in which these discoveries may be utilized causes the invention to have several different embodiments. In one embodiment, sulfur oxides are removed from a power plant flue gas stream by acceptor beds located upstream of the electrostatic precipitator which removes fly ash from the flue gas stream and between the economizer and the air preheater. This embodiment is preferred for several reasons. For instance, placement of the acceptor beds at this location maximizes the energy efficiency of the power plant. It also allows the use of a "cold" precipitator rather than a "hot" precipitator which costs about 1.5 to 2.0 times as much. Another advantage is that particle accumulation is negligible or minimized by this mode of operation.

In a second embodiment of the invention, the acceptor beds used to remove sulfur oxides from the flue gas of a power plant are located downstream of the particle removal zone. In this embodiment, additional particles are injected into the flue gas stream either continuously or intermittently. This may require the subsequent removal of the added particles, as by recycling the treated gas stream to the particle removal zone.

In a third embodiment of the invention, the removal of particulate matter from the screen openings of a parallel passage acceptor or reactor bed is integrated into the acceptor regeneration procedure. This embodiment allows the invention to be retrofitted to existing units and also does not require the injection and subsequent removal of particles from the gas stream being treated.

Much of the discussion herein is presented in terms of using the invention on parallel flow acceptors wherein sulfur oxides are chemically or physically taken up and removed from a gas stream. This is to provide a detailed background for the different embodiments and to provide an example which may be followed in adapting the invention to other processes. The application of the invention is not confined to a particular gas treating process, and the use of sulfur oxide acceptor nomenclature is not meant to limit the scope of the invention to use solely on such acceptors. The use of the invention is extendable to other parallel flow contacting systems. These systems include the use of parallel flow reactors to effect the reduction of nitrogen oxides to elemental nitrogen or the chemical reaction of a sulfur compound, such as the oxidation of sulfur dioxide to sulfur trioxide. The invention may therefore be applied to other sulfur oxide emission control processes including those described at page 43 of the August, 1972 edition of *Chemical Engineering Progress* (Vol. 68, No. 8).

Parallel flow solids-vapor contactors may also be used in an adsorption process, and the pellets retained within the apparatus may therefore be adsorbents such as alumina, zeolites or charcoal. In these processes, the contactor may be used to effect the removal of aromatic hydrocarbons, halogen compounds including halogenated hydrocarbons, sulfur compounds and other chemicals from particle-laden effluent or recycle streams. The adsorbed chemical compound may therefore be one or more of the group consisting of hydrogen sulfide, sulfur dioxide, hydrogen chloride, hydrogen bromide, hydrogen fluoride, boron trifluoride, carbon tetrachloride, ammonia, benzene, butane, pentane, acetylene, paraxylene, styrene, pyridene, aniline and dichloro-naphthalene.

The sulfur oxide removal embodiments of the subject processes can be applied to gas streams originating in a wide variety of industries. These gas streams may contain sulfur dioxide and/or sulfur trioxide from coal or fuel oil-fired power plants, smelters, fired steam generators, industrial furnaces, petroleum and oil shale refining operations and the off-gases of other chemical processes. The composition of the acceptor may vary from the preferred acceptor described below to facilitate the removal of other sulfur compounds including hydrogen sulfide or the simultaneous reduction of nitrogen oxides.

The removal of sulfur oxides from a gas stream through the use of an acceptor has two basic phases; acceptance, in which sulfur oxide reacts with a solid acceptor, and regeneration, wherein the spent acceptor is prepared for reuse in the acceptance step. The acceptance step is normally effected by contacting the acceptor with a feed stream containing $SO_2$ and oxygen. The feed stream may be any gas containing sulfur dioxide or sulfur trioxide in air-polluting quantities and also containing sufficient oxygen to stoichiometrically combine the sulfur dioxide and a metal oxide to form a metal sulfate upon contact with a solid acceptor. Examples of such gases include flue gas from oil and coal-fired power plants containing residual combustion oxygen or added oxygen.

Preferably, the acceptor comprises copper oxide supported on a carrier material which is resistant to high temperatures and which is not attacked by sulfur oxides and other components of the gas stream to be treated. These carriers are referred to in this context as inert carriers. Suitable examples of these carriers are natural clays which may or may not be acid pretreated, bauxite, alumina, boria, silica, silica-alumina, etc. Preferred carriers have a relatively large specific surface area to provide for maximum contact area and high loading of the acceptor. The surface area should be at least 10 $m^2/g$. A typical parallel flow acceptor bed contains a layer of individual acceptor pellets about 1.5-10 cm. thick retained between two woven wire screens. The gas stream to be treated may therefore flow parallel to both outer surfaces of the acceptor bed.

The use of other metals and metal compound including vanadium oxide and cerium oxide on acceptors is known in the art, and the inventive concept disclosed herein may be applied to any of these other metals. However, it is preferred that a copper-containing acceptor is used as this allows the acceptance and regeneration phases to occur at substantially the same temperature range. This provides a simpler system which is not subjected to stresses due to thermal cycling. The copper content of the acceptor may vary within wide limits. It is preferred to contain at least 1 wt.%, and preferably from 5 to 15 wt.% of copper calculated on the basis of total acceptor composition. It is generally impractical to have a copper content higher than about 25 wt.%. It has been found that the presence of chromium oxide, palladium and/or silver in the acceptor promotes sulfur dioxide removal. This promotor may be present in an amount of about 0.1 to 10 wt.% calculated on the basis of the total acceptor. It has also been found that the stability of the acceptors may be increased by the inclusion of small quantities, that is less than 5 percent and preferably 0.1 to 2 percent by weight of barium oxide. Further details on the manufacture of sulfur oxide acceptors may be obtained by reference to U.S. Pat. Nos. 3,770,647; 3,776,854; 3,989,798; 4,001,375 and 4,001,376.

During the removal of sulfur oxides, the $SO_2$-containing gas is contacted with the acceptor by passing the gas between parallel beds of pelletized acceptor material. The apparatus used for this may be constructed in the manner indicated in previously cited U.S. Pat. Nos. 3,501,897; 3,707,831 and 3,747,308. This apparatus may take the form of planar or cylindrical envelopes of woven wire mesh which enclose the acceptors. The acceptance phase proceeds under oxidative conditions in the presence of oxygen at temperatures between 300° C. and 500° C., preferably between 325° C. and 475° C. Operation outside of these ranges is not desired.

Regeneration of the acceptor is effected in the presence of a reducing gas at a temperature approximately equal to the acceptance temperature. The preferred temperature range will vary with the reducing gas and the composition of the acceptor. Temperatures of from about 200° C. to 500° C. may be used, but the temperature is preferably kept between 350° C. and 450° C. At these temperatures and in the presence of a reducing gas, copper sulfate releases the bulk of the accepted sulfur as sulfur dioxide to provide a concentrated stream of sulfur dioxide. This concentrated stream of $SO_2$ facilitates further processing for the recovery of elemental sulfur which is not feasible with the relatively dilute gas streams passed through the process during the acceptance phase. Suitable reducing gases for the regeneration phase include hydrogen or hydrogen/carbon monoxide mixtures and various $C_1$–$C_3$ hydrocarbons. Examples of appropriate hydrocarbons include methane, ethane, propane and butane or mixtures such as natural gas. One particularly preferred reducing gas comprises a mixture of steam or other inert diluent and a hydrocarbon having three or more carbon atoms per molecule. Regeneration pressure is not critical, and atmospheric pressure is acceptable. Further details on the regeneration procedure are available in U.S. Pat. Nos. 3,832,445 and 3,892,677.

The conditions utilized in other gas treating processes to which the subject invention is adapted will most likely be different from those set out above for sulfur oxide removal using acceptors. For example, the conditions used during the adsorption of a chemical compound from the gas stream may be those which are customarily used in a particular adsorbent-adsorbate system. A broad range of adsorption conditions include a pressure of from about 0° C. to 80° C. and a pressure of from 0.1 to 5.0 atmospheres gauge. The regeneration step may also be conducted at customary conditions which normally comprise a higher temperature of up to 250° C. and may comprise a lower pressure. Likewise, when the vapor-solids contactor is used as a reactor, the conditions of temperature and pressure will be those normally used with the specific catalysts in the contactor and the reactants being passed across the contactor. All processes in which a parallel pass contactor is used are preferably operated with the gas stream having a sufficiently high velocity across the outer surface of the acceptor bed to generate a Reynolds number indicative of a turbulent flow regime.

The reduction of nitrogen oxides to nitrogen is catalyzed by copper sulfate on alumina. It may therefore be performed simultaneously with the acceptance of sulfur oxides on copper-containing acceptors. The reaction is preceded by the admixture of ammonia into the gas stream being treated, preferably at a near stoichiometric rate. Reaction conditions may be similar to those used in the removal of sulfur oxides by acceptance as described above.

The benefits of the invention are illustrated by the test results obtained using a portion of the flue gas of a commercial coal-fired power plant. The flue gas stream had a temperature which varied from about 735° F. to 750° F. and it contained approximately 1,300 ppm. of sulfur dioxide. The tests were performed using the preferred copper-containing parallel flow acceptors. The flue gas stream was passed parallel to the outer surface of an acceptor bed at velocities in excess of 10.5 meters/second. The fly ash content at the inlet of the electrostatic precipitator varied from about 5 to 20 grains per standard cubic foot and was normally less than 0.02 grains per standard cubic foot at the outlet of the precipitator. The acceptor bed was separated from the flue gas stream by a fine mesh screen.

At the beginning of the tests, the flue gas from the outlet of the precipitator was passed across an acceptor bed in the normal manner. There occured a gradual accumulation of particles on the surface of the acceptor screen, which fouled the acceptor beds and degraded the desulfurization performance of the system. Microphotographs revealed the particulate matter contained in the flue gas stream downstream of the precipitator had a relatively uniform and small particle diameter. The standard for this size comparison was a sample of the particulate matter obtained from upstream of the precipitator. Compared to the downstream particles, the upstream particles had a wide range in particle diameters, with much of the difference between the two samples being due to the absence of relatively large diameter particles in the downstream sample.

A first series of tests was performed to measure the effectiveness of the addition of relatively coarse particles to the precipitator effluent in removing accumulated particles from the surface of the acceptor screens. During these tests, equilibrium fluidized catalytic cracking (FCC) catalyst was injected into the flue gas stream at a point between the electrostatic precipitator and the acceptor beds. The rate of injection was approximately 50 lb. in 24 hours in slugs of 5 lb. The fouling of the acceptor screens was monitored by a pressure drop measurement taken between the inlet and outlet of a bed of sulfur oxide acceptors. The accumulation of particulate material on the surface of the screen smooths the surface of wire mesh. This in turn reduces surface roughness of the gas channel and the pressure drop through the acceptor bed. The injection of the FCC catalyst resulted in an increase in the pressure drop, which indicated surface roughness was being restored and accumulated fine particles were being removed from the screen. Continuous injection of the FCC catalyst resulted in the pressure drop rising to a relatively constant level equivalent to that of clean screens. Interruption of the FCC catalyst injection resulted in a gradual decrease in the pressure drop to its previous lower level.

The removal of accumulated fine particles and the prevention of their accumulation was therefore found to correlate with the injection of the relatively coarse FCC catalysts. Besides demonstrating the advantages derived by use of the invention, these tests also indicate that an effective rate of particle addition may be determined without undue experimentation by monitoring the pressure drop through a set of the contactors. This allows the subject process to be adapted to other processes wherein the optimum rate of particle addition could differ from that found effective in these tests. The optimum rates of particle addition may differ in different situations because of such variable factors as coal compositions, coal crushing and combustion techniques, flue or acceptor configurations, the particle size distribution of the fly ash or soot, the shape and smoothness of the particles and the efficiency of the particle removal apparatus employed.

The FCC catalyst used in the tests was similar to that which is readily available commercially for use in petroleum refining. It is not believed the composition of the FCC catalyst used is an important or determinant factor. It was a readily available material having appropriate physical properties. FCC catalyst will normally have an average particle diameter of from about 40 to 60 microns. The typical particle size distribution is from about 0.5 to 200 microns. A comparison of microphotographs of the FCC catalyst and the particles collected upstream of the precipitator revealed that most of the FCC catalyst particles were about the size of the larger particles which were removed in the precipitator used at the test facility.

A second series of tests was performed to determine if operation using the unseparated flue gas upstream of the precipitator would have the same results as the injection of the FCC catalysts. A slip stream of flue gas was bypassed around the precipitator and treated for sulfur dioxide removal using parallel passage acceptors. The result was that the desulfurization and pressure drop did not change from that measured with a completely clean system operating on air plus $SO_2$. Furthermore, after five days and 150 regeneration cycles, the reactor internals were inspected and the screens were found to be clean and free of particle accumulation.

The invention may be applied to the removal of accumulated particles in two distinctly different ways. That is, the injection of the additional particulate material may be continuous to prevent the accumulation of particles, or it may be performed intermittently to remove previously accumulated particles. The optimum rate of particle addition may therefore be expected to vary with the way in which the invention is applied, with higher rates of coarse particle addition being required if the particle injection is only intermittent. Although a higher injection rate may in some instances be necessary, it is preferred that the particle injection rate does not produce a particle concentration above about 20 grains per standard cubic foot in the gas stream entering the acceptor zone. More preferably, the total particle concentration will be maintained within the range of about 1.0 to 15 grains per standard cubic foot.

It is preferred that the additional particulate material be what may be referred to as coarse or relatively coarse. Unless otherwise specified, the characterization of the added particulate matter as coarse or relatively coarse is intended to indicate that it has an average particle diameter which is at least twice that of the particles remaining in the gas stream as it emerges from a particle removal zone located upstream of the contactor. In situations in which no particle removal zone is used, the term "coarse" is intended to indicate an average particle diameter above about 50 microns. The coarse particulate matter may be other than FCC catalyst. For instance, suitable small, hard, fluidizable particles may be obtained by the screening of sand or furnace slag. Another source of coarse particles may be the gas stream itself. That is, the particles removed in the electrostatic precipitator or other device used in particle removal may be classified by size, with at least a portion of the quantity of larger relatively coarse particles which is formed in this manner being used as the injected material.

As used herein, the term "fluidizable" is intended to indicate particles having a combination of size and density which allows them to be readily transported by a moving vapor stream. The velocity of this vapor stream is to be within the range desired for use within the parallel passage vapor-solids contactors. Therefore, the vapor stream will have a velocity sufficient to produce turbulent flow across the contactor and preferably will have a velocity in excess of about 10.5 meters/sec.

In the third embodiment of the invention, accumulated fine particles are removed from outer surface of the parallel flow solids-vapor contactor during the regeneration phase of the preferred sulfur oxide removal process. This cleaning of the acceptor screen can be performed at three different times. That is, the screens may be cleaned either before, during or after the actual reduction operation. The coarse particle-containing gas stream which is used for this purpose is referred to herein as the acceptor zone conditioning stream. One variation of this embodiment of the invention may be characterized as a cyclic regenerative process for removing sulfur oxides from flue gas which comprises passing a flue gas stream comprising sulfur oxides and particulate matter parallel to the outer surface of a metal-containing acceptor bed under conditions which effect the removal of sulfur oxides from the flue gas stream by the formation of sulfur-containing metal compounds on the acceptor bed; terminating the flow of the flue gas stream across the acceptor bed, passing an acceptor zone conditioning vapor stream comprising particulate matter having an average particle diameter at least twice as great as the average particle diameter of the particulate matter in the flue gas stream parallel to the outer surface of the acceptor bed and removing accumulated particulate material from the outer surface of the acceptor bed; and, terminating the flow of the acceptor zone conditioning vapor stream across the acceptor bed, contacting the acceptor bed with a reducing gas at regeneration conditions, and forming an effluent stream comprising sulfur oxides.

The acceptor zone conditioning vapor stream may be disposed of by injection into the main gas stream being treated at a point upstream of the particle removal zone. It should be noted that the use of the acceptor zone conditioning stream may not be required during each regeneration operation. The passage of this stream across the acceptor bed may therefore be perfomed during only every second or tenth regeneration as is necessary to maintain an acceptable level of acceptor performance. This gas stream would preferably have a temperature and pressure near that of the reducing gas or the gas stream being treated. Also, it would preferably be passed across the screen forming the outer surface of the acceptor bed at a velocity in excess of 10.5 meters/sec. The acceptor zone conditioning vapor stream is formed by admixing the required amount of particulate material into a suitable carrier gas. This carrier gas may comprise treated or untreated flue gas.

In a fourth embodiment of the invention, the gas stream to be treated is first passed into a particle size distribution adjustment zone. Additional fluidizable particulate material is added to the gas stream in this zone at a rate sufficient to prevent the accumulation of particulate material on the outer surface or screen of a parallel passage contactor. The resultant particle-laden gas stream is passed across the outer surface of the solids-vapor contactor at conditions effective to promote the desired treatment of the particle-rich gas stream.

The relatively coarse particulate material used in the fourth embodiment of the invention may be characterized in terms of larger and smaller sized numerical halves of the particulate material contained in the relevant gas streams. By the term "larger sized numerical half of the particulate material" it is intended to refer to that portion of the total particulate material in the specified gas stream which contains 50%, on a numerical basis, of all the fluidizable particles in the gas stream, with all particles in this portion having a larger particle diameter than those in the remaining 50%. The smaller size numerical half is the remaining 50%. Therefore, as used herein the term "sized" refers to particle size, and the term "half" refers to a division made on the basis of the number of particles.

The average particle diameter for each numerical half of the particles is determined in the customary manner also used for the specification of this physical characteristic. That is, the average particle diameter for each numerical half is determined in the same manner as for a fluidized catalytic cracking process catalyst or similar materials. The average particle diameter will be specified in some units of length, typically microns. The amount of coarse particles which is to be added should increase the difference in the average particle diameters by at least 10%. The percentage of difference is determined from a comparison of the difference in the average particle diameters before and after the addition of the coarse particles. For example, assuming the smaller sized numerical half of the particles has an average diameter of 35 microns and the larger sized numerical half has an average diameter of 65 microns, then the average diameter of the larger sized half is to be increased by at least 3 microns. This is 10% of the difference of 30 microns. Preferably, he difference between the two halves is increased by 20% but less than 150%.

The particle size distribution adjustment zone may have any mechanical configuration which adequately performs the required functions without interferring with or materially hindering the operation of other zones and equipment used in the overall process. The functions of this zone are to provide a means to add the relatively coarse particulate material to the gas stream and to admix the various sized particles prior to the passage of the gas stream alongside the contactor. The particle size distribution adjustment zone will normally comprise a means for metering the rate of coarse particle addition. It may comprise either moving or static mixing devices to agitate the gas stream or this mixing can be performed by turns in the conduit carrying the gas stream. In its most simple form, the zone will comprise a section of ductwork upstream of the contactor of suitable length and diameter to cause admixture of the coarse particles into the gas stream. This will require some turbulence in the ductwork.

I claim as my invention:

1. In a method of removing noxious gaseous atmospheric pollutants selected from the group consisting of sulfur oxides and nitrogen oxides from a flue gas stream of a coal-fired combustion zone wherein said flue gas is passed through (i) a particle removal zone wherein particulate particles are removed from said flue gas stream; and (ii) a stationary parallel passage contacting zone wherein said noxious pollutants within said flue gas stream are substantially reduced to produce a flue gas stream containing a decreased quantity of said noxious pollutants; the improvement which comprises:

(1) classifying by size said particulate particles removed from said flue gas stream in said particle removal zone to produce a quantity of relatively coarse particles having an average particle size at least twice as great as the average particle diameter of said particles in said flue gas stream and a quantity of relatively fine particles;

(2) admixing at least a portion of said quantity of relatively coarse particles into said flue gas stream containing said noxious pollutants;

(3) passing said flue gas stream containing said noxious pollutants and said quantity of relatively coarse particles through said stationary parallel passage contacting zone under turbulent conditions to reduce the quantity of deposited fine particulate material from the outer surface of said stationary parallel passage contactor; and (4) passing said flue gas stream containing said quantity of relatively coarse particles to said particle removal zone to remove at least a portion of said quantity of relatively coarse particles from said flue gas before emission of said flue gas containing a reduced quantity of said noxious pollutants to the atmosphere.

2. The method of claim 1 wherein the injection of the relatively coarse particles into said flue gas stream is performed continuously.

3. The method of claim 1 wherein said injection of said relatively coarse particles into said flue gas stream is performed intermittently.

* * * * *